(12) United States Patent
Western (10) Patent No.: US 7,489,703 B2
(45) Date of Patent: Feb. 10, 2009

(54) APPARATUS AND METHOD FOR A CODING SCHEME SELECTION

(75) Inventor: Gary Edwin Western, Round Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 1093 days.

(21) Appl. No.: 10/324,905

(22) Filed: Dec. 20, 2002

(65) Prior Publication Data

US 2004/0120280 A1    Jun. 24, 2004

(51) Int. Cl.
*H04J 3/16* (2006.01)
(52) U.S. Cl. ........................ 370/465; 370/496
(58) Field of Classification Search ................. 370/465, 370/470
See application file for complete search history.

(56) References Cited

U.S. PATENT DOCUMENTS

| | | | |
|---|---|---|---|
| 5,920,545 A | 7/1999 | Rasanen et al. | |
| 5,924,026 A | 7/1999 | Krishnan | |
| 5,991,642 A * | 11/1999 | Watanabe et al. | 455/560 |
| 6,134,230 A * | 10/2000 | Olofsson et al. | 370/337 |
| 6,256,487 B1 | 7/2001 | Bruhn | |
| 6,363,425 B1 | 3/2002 | Hook et al. | |
| 6,400,928 B1 | 6/2002 | Khullar et al. | |
| 6,549,759 B2 | 4/2003 | Arviv et al. | |
| 6,567,375 B2 | 5/2003 | Balachandran et al. | |
| 2002/0010001 A1* | 1/2002 | Dahlman et al. | 455/522 |
| 2003/0142694 A1 | 7/2003 | Takano | |
| 2003/0198312 A1* | 10/2003 | Budka et al. | 375/377 |

FOREIGN PATENT DOCUMENTS

| | | |
|---|---|---|
| WO | 9941872 | 8/1999 |
| WO | 2000-018172 A1 | 3/2000 |
| WO | 0215625 A1 | 2/2002 |

OTHER PUBLICATIONS

Englund, "Nonlinear Unequal Error-Protection Codes Exceeding the Katsman Bound," Proceedings of the 1994 IEEE International Symposium on Information Theory, Jun. 27 - Jul. 1, 1994, p. 502.
Sun et al., "Adaptive Two-Level Unequal Error Protection Convolutional Code Scheme for Wireless ATM Networks," Proceedings of the 19th Annual Joint Conference of the IEEE Computer and Communications Societies, INFOCOM 2000, Mar. 26-30, 2000, vol. 3, pp. 1693-1697, especially 1693.

* cited by examiner

*Primary Examiner*—Hassan Kizou
*Assistant Examiner*—Bo Hui A Zhu (57) ABSTRACT

A method is for selecting a coding scheme for use in a wireless packet data communication system. The coding scheme is one of a set of coding schemes that are useable on an uplink or downlink channel. States of support of a mobile station corresponding to the set of coding schemes are set to one of a set of values including supported, unsupported, and unknown support. A portion of an uplink or downlink data transfer for the mobile station is transmitted using a first coding scheme. The state of support of the mobile station for the first coding scheme is set to one of supported and unsupported based on whether the data transfer is received successfully. A quality measurement is performed during the transfer. A second coding scheme is then selected based upon the quality measurement and the set of states of support of the mobile station.

17 Claims, 8 Drawing Sheets

APPARATUS AND METHOD FOR A CODING SCHEME SELECTION

This application is related to two co-pending applications entitled "APPARATUS AND METHODS FOR A CODING SCHEME SELECTION" U.S. Ser. No. 10/200,367, filed on Jul. 22, 2002, and "METHOD FOR DETERMINING MOBILE STATION CODING SCHEME ADAPTATION CAPABILITY" U.S. Ser. No. 10/261,991 filed on Oct. 1, 2002 and assigned to the assignee of this application.

FIELD OF THE DISCLOSURE

This disclosure relates generally to wireless communication networks, and more particularly to a method and apparatus for coding scheme selection in a packet radio system.

BACKGROUND

In wireless networks employing General Packet Radio Service (GPRS), a coding scheme for data message transmissions is selected by rules embedded in a fixed network and in a mobile station that are designed to result in the highest data throughput with the fewest possible retransmissions. GPRS is an extension of circuit-switched networks and data transmission services that uses packet radio transmissions to carry data messages using protocols such as Internet Protocol (IP) or X.25 information from mobiles to the network and visa versa, in data blocks, or packets. GPRS is an extension to the circuit-switched Global System for Mobile communications (GSM), having four different coding schemes with effective data rates of 9.05, 13.4, 15.6 and 21.4 kilobits per second (code rates ½, ⅔, ¾ and 1) within the data blocks.

Some GPRS-enabled fixed networks can send a command to a mobile station, such as a cell phone, an Internet-enabled mobile phone or a personal digital assistant, to transmit data blocks using a selected one of the four coding scheme. The error rate of the selected coding scheme may rapidly degrade, however, with changing radio conditions or geographical movements of the mobile device. The mobile unit may have limitations in its coding capabilities and its ability to adapt to coding scheme commands. With the move toward third-generation network standards, there are even more possible problems with high-performance networks that use a wider variety of coding schemes. Mobile stations need to adapt their coding schemes rapidly during a data message when possible, and the fixed network needs to recognize mobile stations that are unable to use certain coding schemes, in order to use a best possible coding scheme and avoid undue retransmissions when a coding scheme is selected that cannot be accommodated by a mobile station.

Current GPRS fixed networks use dynamic link adaptation methods that monitor the quality of packet transfers and select one of the four presently defined channel coding schemes (also referred to herein simply as "coding schemes") based on changing radio conditions. As technologies and protocols emerge and evolve for wireless data transmissions, additional coding schemes will become available. For example, GSM networks incorporating Enhanced Data for Global Evolution (EDGE) with packet-switched enhancements for GPRS have nine additional coding schemes for increased performance. Other wireless network technologies such as GSM/EDGE Radio Access Network (GERAN) and Universal Mobile Telecommunications System (UMTS) provide enhanced coding schemes, requiring network algorithms that can determine the coding scheme adaptability of the mobile station and direct coding scheme commands to the mobile station based on the adaptability. When mobile stations do not respond to all of the defined set of four coding schemes, dynamic link adaptation methods in current use result in sub-optimal data throughput, and in some case, can result in no communication capability with certain mobile stations.

SUMMARY OF THE INVENTION

In a first aspect of the invention, a method is for selecting a coding scheme for use on an uplink channel of a wireless packet data communication system. The coding scheme is one of a set of coding schemes that are useable on the uplink channel. In the method, each state in a set of states of support of a mobile station that correspond to the set of coding schemes is set to be either supported, unsupported, or unknown support. The mobile station is directed to transmit a portion of an uplink data transfer using a first coding scheme of the set of coding schemes. The state of support of the mobile station for the first coding scheme is set to unsupported when the portion of the uplink data transfer is not received having the first coding scheme. A second coding scheme is selected based upon the set of states of support.

In a second aspect of the invention, a method is for selecting a coding scheme for use on a downlink channel of a wireless packet data communication system. The coding scheme is one of a set of coding schemes that are useable on the downlink channel. In the method, each state in a set of states of support of a mobile station that correspond to the set of coding schemes is set to be either supported, unsupported, or unknown support. A portion of a downlink data transfer is transmitted to the mobile station using a first coding scheme of the set of coding schemes. The state of support of the mobile station for the first coding scheme is set to unsupported when no acknowledgment to the portion of the downlink data transfer is received. A second coding scheme is selected based upon the set of states of support.

In a third aspect of the invention, a method is for selecting a coding scheme for use on an uplink channel of a wireless packet data communication system. The coding scheme is one of a set of coding schemes that are useable on the uplink and downlink channels. In the method, each state of uplink and downlink sets of states of support of a mobile station for each of the set of coding schemes is set to either supported, unsupported, or unknown support. A first coding scheme having the uplink state of support of the mobile station for the first coding scheme set to unknown support is selected for use by the mobile station for an uplink data transfer only when the downlink state of support of the mobile station for the first coding scheme is set to supported.

In a fourth aspect of the invention, a method is for managing storage space in a wireless packet data communication system that has a set of coding schemes that are useable on the uplink and downlink channels. In the method, a table having a set of states of support of a mobile station for each of the set of coding schemes is set up. The table is erased after a predetermined duration during which no uplink data transfer and no downlink data transfer is communicated with the mobile station.

BRIEF DESCRIPTION OF THE DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

The present invention provides a method for optimizing the selection of a coding scheme used for data messages to and from a mobile station in a system that includes mobile stations that do not support a subset of a defined set of coding schemes, thereby maximizing data throughput for all mobile stations connected to the network.

The method for selecting a coding scheme for a mobile station of the present invention maximizes data throughput for a mobile station connected within a GPRS network even when the mobile station is device that can respond only to lower data rate coding schemes. The invention helps insure that the throughput of data from a lower-performing mobile station is the highest possible.

It is anticipated that as third generation networking capacities supersede older two-generation (2 G) or 2.5 G network technologies, this invention will help the network to remain backward capable with older mobile stations and help optimize the performance of devices not employing the latest radio technologies and protocols. With this invention, throughput of these mobiles stations may be increased as much as 100 percent or more.

When the network sends the mobile station a command to change a coding scheme, the mobile station may behave in one of several ways. For example, the mobile station may transmit the next data blocks using the new configuration. It may continue to transmit blocks using the old configuration before blocks with the new configuration are transmitted. It may transmit using a coding scheme other than the one commanded, such as the one it was using.

The present invention rapidly determines an optimum coding scheme for a mobile station, even when the mobile station does not respond to a command to change to a coding scheme it does not support.

Figure 1:
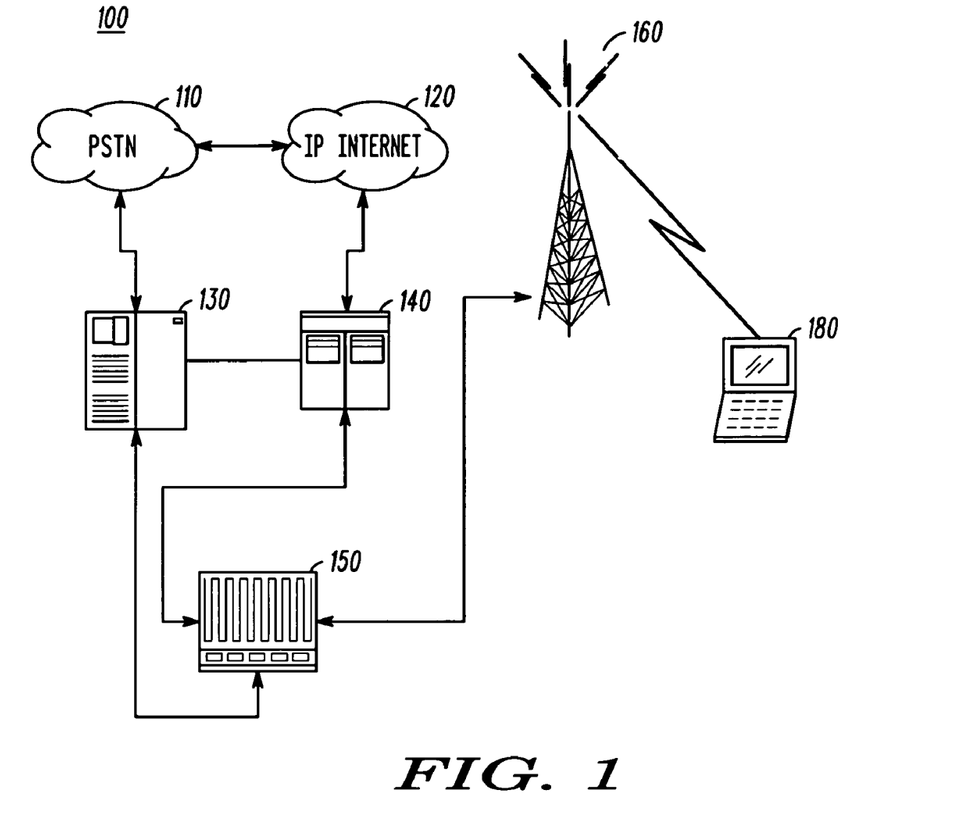
FIG. 1 is a schematic diagram of one embodiment of a system for determining coding scheme adaptation capability of a mobile station, in accordance with the present invention.

FIG. 1 shows a block diagram of one embodiment of a communication system 100, in accordance with a preferred and alternative embodiments of the present invention. The communication system 100 includes one or more public-switched telephone networks (PSTN) 110, an Internet 120, one or more mobile switching centers (MSC) 130, one or more general packet radio service support nodes (GSN) 140, one or more base site controller and packet controller units (BSC/PCU) 150, one or more radio tower or base transceiver stations (BTS) 160, and one or more wireless mobile stations (MS) 180 such as a Internet-enabled cellular phone, a personal digital assistant or a laptop computer with wireless networking capabilities.

An exemplary network technology that may be used for network operations is Global System for Mobile (GSM) communications, a digital cellular standard used throughout the world. GSM data services include circuit-switched voice services, circuit-switched data, short message services (SMS), 2.5 G and third-generation (3 G) technologies that expand data-packet technologies and new multimedia types of wireless service. GSM uses three major frequency bands, including blocks of radio spectrum within the 900-, 1800-, and 1900-MHz bands. The 900- and 1800-MHz bands are the principal bands used in Europe and Asia, and the 1900-MHz band is used in North America.

With wireless networks employing General Packet Radio Service (GPRS), a mobile station is commanded to transmit data blocks at the optimal coding scheme that the network determines will result in the highest data throughput with the fewest possible retransmissions. For example, GPRS may offer transmissions via a GSM network within a range of 9.6 kilobits to 115 kilobits and allow users to make telephone calls and transmit data at the same time, the latter using an IP data transmission protocol.

Another embodiment of the wireless network may include Enhanced Data for Global Evolution (EDGE), which is moving toward wideband code division multiple access (WCDMA). EDGE may be used as a packet-switched enhancement for general packet radio service (GPRS), known as enhanced GPRS or EGPRS, and as a circuit-switched data enhancement called enhanced circuit-switched data (ECSD).

Public-switched telephone network (PSTN) 110 is a land-based telephone network. PSTN 110 may comprise one or more switched lines over one or a combination of wire, fiber, or wireless links. PSTN 110 is typically connected to Internet 120 and MSC 130.

Internet 120 is a public data communication network, which may comprise one or more electronic, optical or wireless communication paths with associated hardware and software to connect PSTN 110 with one or more wireless data devices 180.

Mobile switching center 130 may receive signals from and send signals to wireless data device 180 via a general packet radio service support node (GSN) 140, base site controller and packet controller units (BSC/PCU) 150, and BTS 160. MSC 130 may contain suitable hardware and software for ensuring that transmissions between wireless data device 180 and BTS 160 are accurate and reliable. Accurate and reliable transmission of data packets (blocks) may require that certain data packets be retransmitted, or encoded in a manner such that the data packets are decoded at the receiver without requiring an additional transmission of the data packets. MSC 130 may communicate with PSTN 110.

Mobile switching center 130 may be connected directly to Internet 120 via GSN 140 without requiring PSTN 110 as an intermediary. GSN 140 works with general packet radio service (GPRS), a packet-mode technique to transfer high-speed and low-speed data and to signal in an efficient manner over GSM radio networks. GPRS may employ GSN 140 to keep track of the location of wireless data device 180 and to perform security functions and access control. GSN 140, which is at the same hierarchical level as MSC 130, may be connected to the system of BTS 160 with frame relay. GSN 140 provides interworking with external packet-switched networks such as Internet 120, and is connected with GSN 140 via the IP-based GPRS backbone network. GSN 140 can help MSC 130 with more efficient coordination of GPRS and non-GPRS services and functionality.

Base site controller and packet controller units (BSC/PCU) 150 may be connected to MSC 130, GSN 140 and BTS 160. The BSC/PCU 150 helps control BTS 160 in call set-up functions, coding schemes to use and use of radio channels, and various maintenance tasks.

Base transceiver station (BTS) 160 contains suitable electronic equipment for transmitting and receiving radio frequency signals. BTS 160 may transmit and receive radio signals and more particularly, digitally encoded signals from wireless data device 180. Communications between BTS 160 and wireless data device 180 includes the transmission of data packets, which may be digitally encoded.

The data packets may be digitally encoded using a coding scheme (codes). The term scheme and code may be used interchangeably as appreciated by those skilled in the art. These schemes may be used in a variety of combinations with one or more received data packets. The transmission of data packets may use one or more modulation schemes, such as 16-QAM (quadrature amplitude modulation) or 8-PSK (phase shift keying). The modulation schemes and encoding schemes may be adaptively chosen based on factors such as requisite bit error rates (BER) or channel quality attributes. In accordance with the present invention, coding schemes are characterized in an ordinal relationship to each other, so that there are higher and lower coding schemes, with the higher coding schemes generally providing higher effective data throughput (i.e, the data rate not including error protection bits), and correspondingly requiring better environmental conditions to achieve sufficiently error free effective data throughput. Conversely, lower coding schemes generally employ either more redundant information or use slower modulation techniques to achieve effective data throughput that is similarly error free. Also, changing the coding scheme from a lower coding scheme to a higher coding scheme is referred to herein as raising the coding scheme, and conversely, a coding scheme can be lowered to a lower coding scheme. A successful transmission of multiple data packets comprising a data message may involve at least one additional transmission attempt (retransmission) of specific data packets whose contents were unsuccessfully decoded at the receiver. The retransmission may comprise a repeated transmission of the data packet that was corrupted in the channel. The retransmission may be sent at a lower coding scheme to improve the reliability of the data. The retransmission may also be sent using the same coding scheme, such as a repeated transmission. The retransmission may be sent at a higher coding scheme for faster data throughput. The coding scheme selection may be determined, for example, with feedback from wireless data device 180, by a data scheme selected by the packet control unit (PCU) portion of the BSC/PCU 150 and communicated to the BTS 160. A detailed description of some of the rules for selecting a coding scheme are described below with reference to FIGS. 7-9.

Wireless data device 180, which may be a cellular phone, a laptop computer, a PDA or other wireless device, is equipped with suitable hardware and software for receiving and transmitting digital transmissions. Wireless data device 180 typically transmits or receives data in a prescribed band of frequencies nominally at 900 MHz, 1900 MHz, or any other suitable band of frequencies prescribed for wireless communication. Wireless data device 180 may be carried by a human user, installed on mobile equipment, used in a fixed location such as on a desk or used in any other application where wireless communication services are desired.

Figure 2:
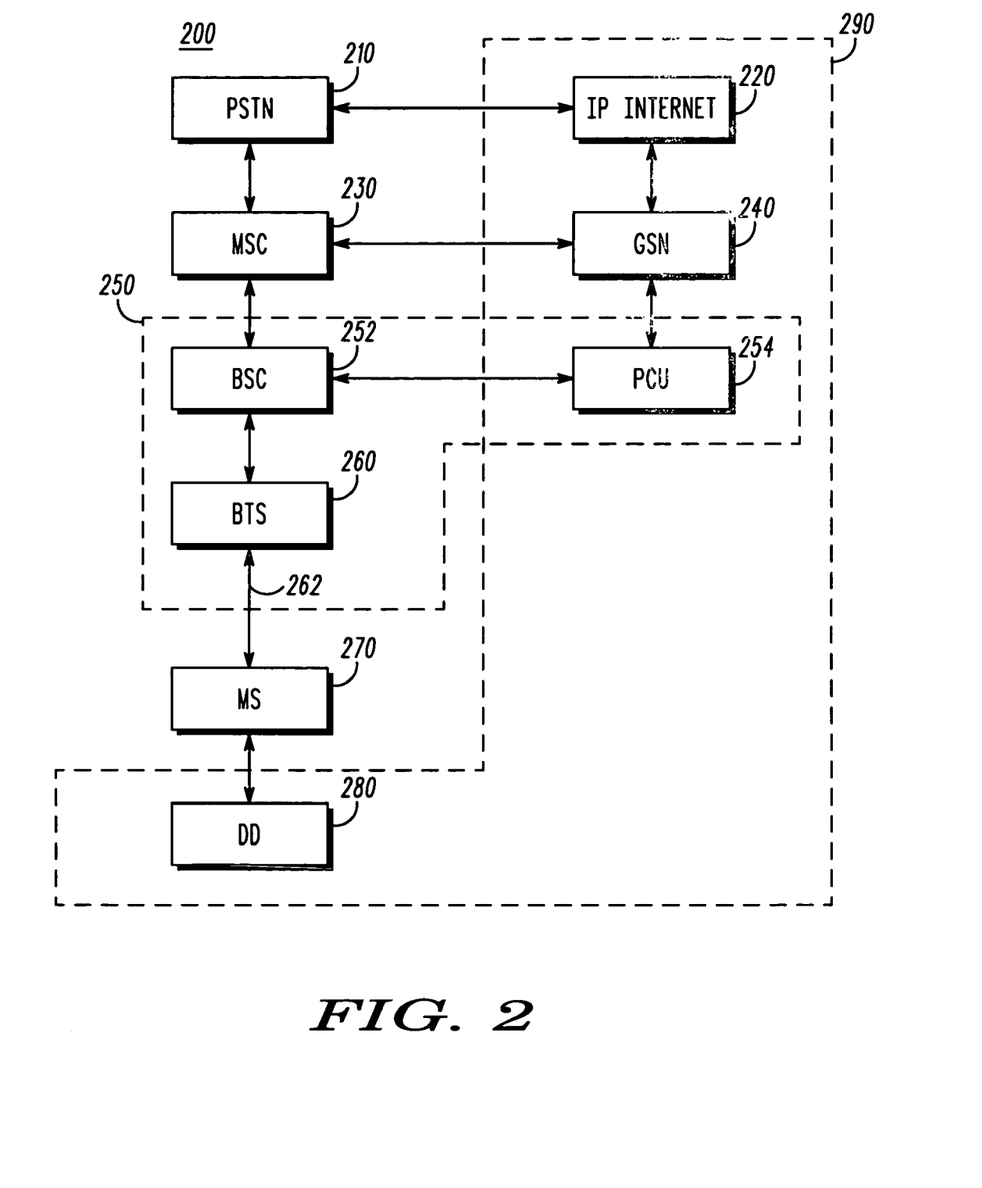
FIG. 2 is a block diagram of one embodiment of a system for determining coding scheme adaptation capability of a mobile station, in accordance with the present invention.

FIG. 2 is a block diagram of one embodiment of a communication system 200 in, in accordance with the present invention. Components of communication system 200 include a public-switched telephone network (PSTN) 210, a mobile switching center (MSC) 230, base station subsystem (BSS) 250, and a packet radio network 290.

Public switch telephone network (PSTN) 210, a land-based telephone network, is coupled to the MSC 230. The packet radio network 290 comprises an Internet-protocol network 220 is coupled to, one or more GPRS support nodes (GSN) 240, which are coupled to one or more packet controller units (PCU) 254. One or more wireless data devices 280 form a portion of the packet radio network 290.

GPRS support nodes (GSN) 240, as payload-carrying and control devices, help the network to switch packet data, routing packets to and from the geographical area of packet radio-specific network 290 and interfacing with Internet-protocol network 220. GSN 240 may be physically separate from the circuit-switched part of a cellular system core network, as shown in FIG. 2, where it is coupled to the MSC 230, or may be integrated with the MSC 230. GSN 240 contains GPRS backbone network protocol (IP) routing functionality, and can be interconnected with IP routers.

Packet Controller Unit (PCU) 254 serves as an interface between BSS 250 and packet radio-specific network 290, performing radio functions and general packet radio service (GPRS) network functions. In addition to PCU 254, base site (or base station) controller (BSC) 252 and base transceiver station (BTS) 260 are components of BSS 250. BSC 252 controls radio signals of multiple cell sites, thus reducing the load on MSC 230. BSC 252 also performs radio signal management functions for BTS 260, managing functions such as frequency assignment and handoff. BTS 260, which may be equipped with antenna and radio equipment, is the central radio transmitter/receiver that maintains communications with mobile station 270 within its cell site or given range.

Mobile station 270 consists of mobile equipment such as a cellular phone and is used to communicate with the GSM network. Mobile station 270 may be coupled to or integrated with the wireless data device 280 such as a mobile personal digital assistant (PDA) or a wireless-capable laptop using over-the-air interface technologies such as those specified in IEEE 802.11. Mobile station 270 couples to base transceiver station 260 via air interface 262, which is a preferably standard signaling system of a standard wireless network technology, preferably conforming to one of the GSM standards.

Other network topologies besides the network architecture described above are possible without departing from the essential characteristics of the present invention. Additional components to separate various functions of a piece of equipment or module may be included with departing from the nature of the present invention.

As previously mentioned, the PCU 254 manages, allocates, and schedules the packet data resources necessary to allow uplink and downlink packet data transmission between the BTS 260 and the MS 270 with its associated wireless data device 280. Specifically, a packet resource manager (not shown) within the PCU 254 receives data, determines how to best "package" the data, and then instructs (via control instructions) the BTS 260 to package the data accordingly. Once received by the MS 270 from the BTS 260, the data packages are "unpackaged" and reassembled, thereby completing the transmission of the data.

For example, layer 2 user data bits received by the PCU 254 from the IP internet 220 via the GSN 240 (resulting from a particular software application) are in the form of Logic Link Control (LLCs) frames. Upon receipt, the PCU 254 splits each of the LLCs into segments of bits and inserts additional bits (e.g., polling bits, data encoding instructions, etc.). The resulting blocks of bits, herein referred to as "segmented blocks," are forwarded to the BTS 260 for transmission as a downlink data message. Based on the data encoding instructions embedded in the segmented blocks by the PCU 254, the segmented blocks are encoded, or modulated, by the BTS 260 using the GPRS coding schemes, and the downlink data message is transmitted to the MS 270 as GPRS radio blocks. Similarly, a data message can be generated by the mobile data device 280 and transmitted from the MS 270 using the GPRS coding schemes. Current GPRS coding schemes selectable by the PCU 254 include Coding Scheme 1 (CS-1), CS-2, CS-3, or CS-4 (see, FIGS. 3-6) and Modulated Coding Scheme 1 (MCS-1), MCS-2, MCS-3, MCS-4, MCS-5, MCS-6, MCS-7, MCS-8, and MCS-9.

The particular GPRS coding scheme selected by the PCU 254 and MS 270 is based on whether the data is control data requiring maximum protection for transmitted bits, or maximum data integrity, requiring CS-1 coding, or whether the data is user data. If the data is user data, varying coding schemes (e.g., CS-1 through CS-4) are selected by the PCU 254, generally based on channel quality factors and knowledge of the coding scheme capabilities of the MS 270, as described in more detail with reference to FIGS. 7 and 8 below.

The BTS 260 and the MS 270 encode the data into the GPRS radio blocks suitable for transmission over the Packet Data Traffic Channel between the BTS 260 and the MS 270. For ease of discussion, the GPRS radio blocks carrying encoded data may be referred to herein as "GPRS data blocks".

Figure 3:
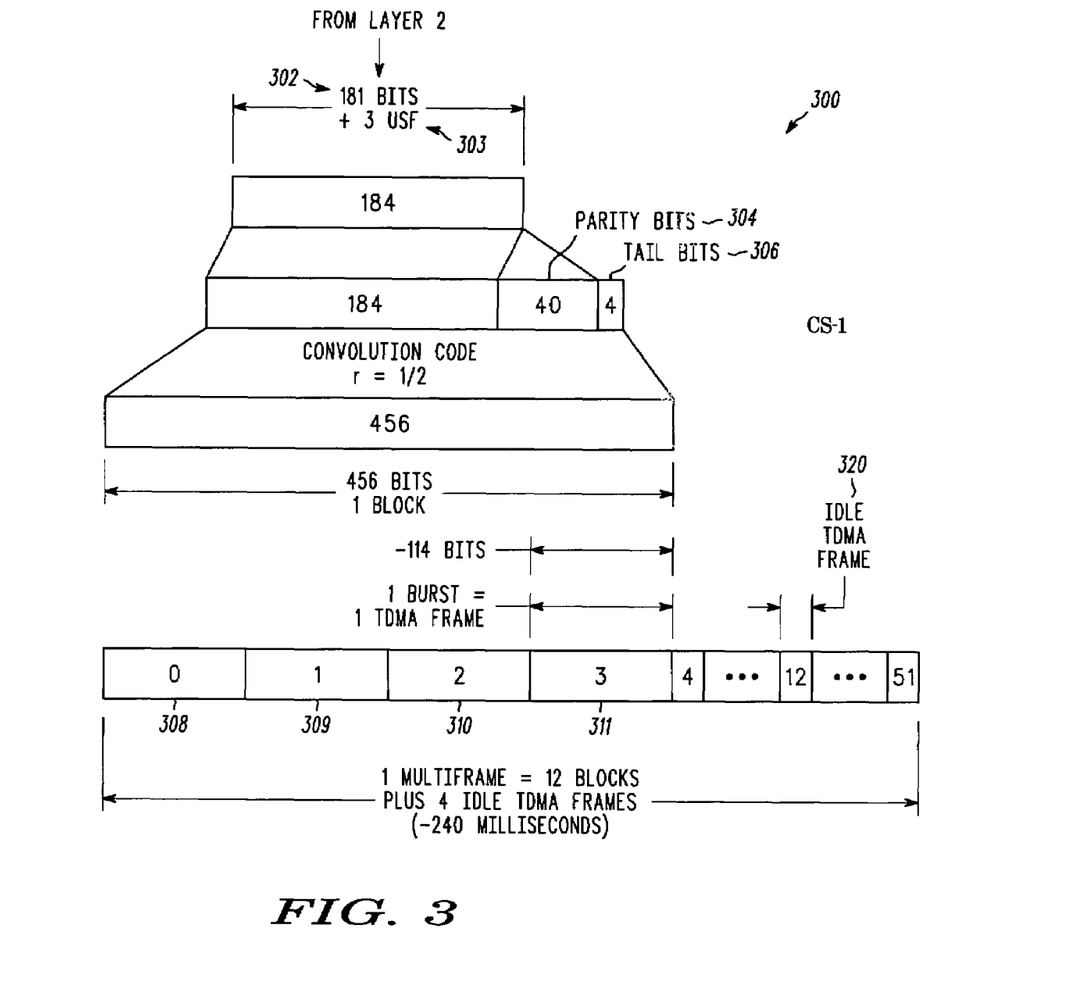
FIGS. 3-6 are illustrations of four coding schemes used for GPRS, in accordance with the present invention.

FIG. 3 is an illustration of coding scheme 1 (CS-1) 300 for maintaining maximum data integrity of GPRS radio blocks in a GPRS packet data transmission channel (PDTCH), in accordance with the preferred and alternative embodiments of the present invention. Referring to FIG. 3, for the CS-1 300, 181 Layer 2 bits resulting from applications (e.g., email, web browser, paging, etc.) as well additional information bits inserted by the PCU 254 are forwarded to the BTS 260 as a portion of a downlink data message (or possibly as a complete, short data message). (Of course, as is known, thousands of bits of layer 2 data may be received by the PCU 254 as a data message from a particular application). Based at least partially on the number of bits received and the information bits inserted by the PCU 254, a predetermined number of uplink state flag (USF) bits 303 are added to the 181 Layer 2 bits 302 by the BTS 260. The USF bits 303 are configured to notify a particular MS 270 that it has uplink transmission rights. Similarly, parity bits 304 and tail bits 306 are added to the 181 Layer 2 bits for error correction, herein referred to as a "block check sequence" (BCS). The addition of the USF bits 303, the parity bits 304 and the tail bits 306 to the Layer 2 bits 302 results in 228 bits to be encoded. To maximize data integrity during transmission, each of the 228 bits of data is copied, resulting in 228 original bits and 228 copied bits for a total of 456 bits (i.e., a ½ code rate) to be transmitted from the BTS 260 to the MS 270. As is known in the art, each group of 456 bits may be referred to a one GPRS data block. The 456 bits are distributed among four "bursts" containing approximately 114 bits/burst (i.e., one TDMA frame) shown in FIG. 3 as bursts 308, 309, 310, 311. Thus, two copies of each the original 181 Layer 2 bits 302 are transmitted from the BTS 260, thereby increasing the odds that each of the original 181 Layer 2 bits 302 are received by the MS 270. Typically, the four bursts 308-311 are transmitted with forty-four additional bursts 312 (representing eleven additional GPRS radio blocks), and four idle bursts (i.e., TDMA frames) in a "multiframe" configuration. As shown in FIGS. 3-6, a multiframe 320 is transmitted in approximately 240 milli-seconds. Upon receipt of the multiframe(s) 320, using well-known methods, bits inserted in the bursts by the BTS 260 at the direction of the PCU 254 are used by the MS 270 to decode and reconstruct the data is a form suitable for receipt by an end user.

Of course, as will be appreciated by those of ordinary skill in the art, the "cost" of using the CS-1 scheme is high in terms of bandwidth resources; less than one data message bit is recovered for every 2 bits transmitted. The GPRS PDTCH coding schemes CH-2, CH-3, and CH-4 are constructed to more efficiently utilize bandwidth resources, depending on the quality or robustness of the communication channel 124. More particularly, CH-2 and CH-3 utilizes controlled bit reduction, herein referred to as "bit puncturing" to reduce the amount of copied data bits transmitted. Moreover, CH-4 adds only USF and parity bits to the original layer 2 bits prior to transmission to the MS 270; no copied bits are transmitted.

Figure 4:
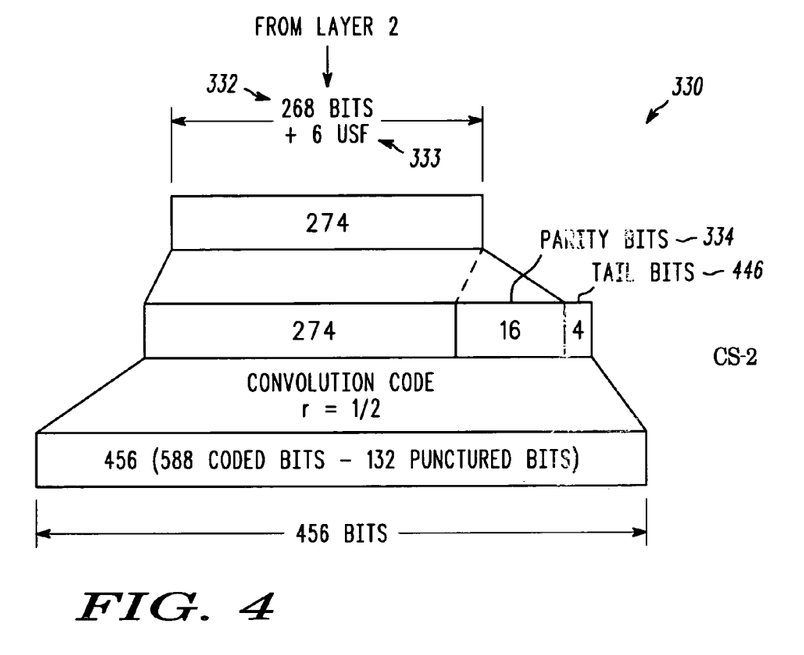

For example, FIG. 4 is an illustration of the coding scheme 2 (CS-2) 330 where approximately ⅓ of the copied bits are punctured. Referring to FIG. 4, for CS-2, 268 Layer 2 bits 332 are transmitted from the PCU 254 to the BTS 260. Similar to CS-1 300, 6 USF bits 333, 16 parity bits 334 and 4 tail bits 336 are added to the 268 Layer 2 bits 332. The addition of the USF bits 333, the parity bits 334 and the tail bits 336 to the Layer 2 bits 302 results in 294 bits to be encoded. Each of the 294 bits of data is copied resulting in 294 original bits and 294 copied bits for a total of 588 bits. Of the 588 bits, however, only 456 bits are transmitted (i.e., a ⅔ code rate) from the BTS 260 to the MS 270. The remaining 132 are selectively discarded based on known statistics. Thus, the original 268 Layer 2 bits 332 and approximately ⅔ of the copied 268 layer 2 bits are transmitted from the BTS 260 to the MS 270.

Figure 5:
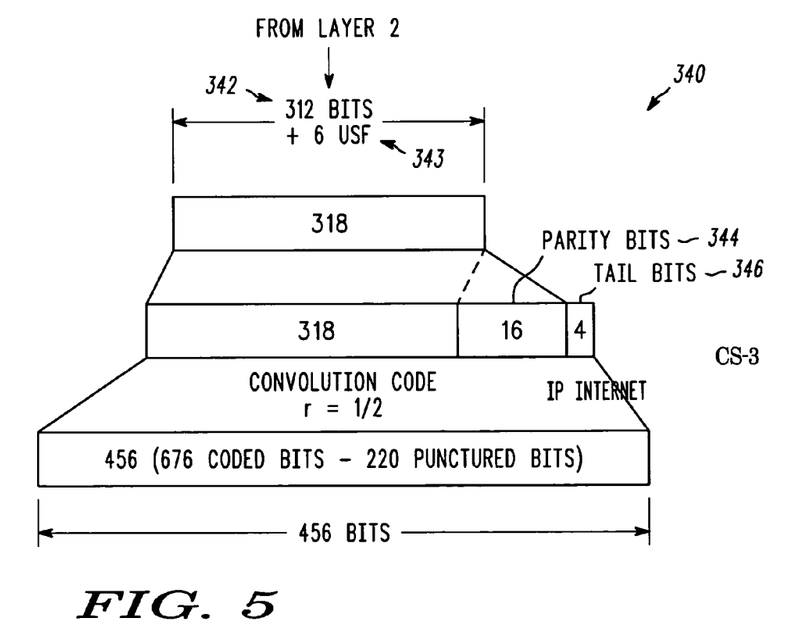

FIG. 5 is an illustration of the coding scheme 3 (CS-3) 340 where approximately ⅔ of the copied bits are punctured. Referring to FIG. 5, for CS-3, 312 Layer 2 bits 332 are transmitted from the PCU 254 to the BTS 260. Like CS-2 330, 6 USF bits 343, 16 parity bits 344 and 4 tail bits 346 are added to the 312 Layer 2 bits 342. The addition of the USF bits 333, the parity bits 334 and the tail bits 336 to the Layer 2 bits 302 results in 338 bits to be encoded. Each of the 338 bits of data is copied resulting in 338 original bits and 338 copied bits for a total of 676 bits. Of the 676 bits, however, only 456 bits are transmitted (i.e., a ¾ code rate) from the BTS 260 to the MS 270. The remaining 220 bits are selectively discarded based on known statistics. Thus, the original 312 Layer 2 bits 342 and approximately ⅓ of the copied 312 layer 2 bits are transmitted from the BTS 260 to the MS 270.

Figure 6:
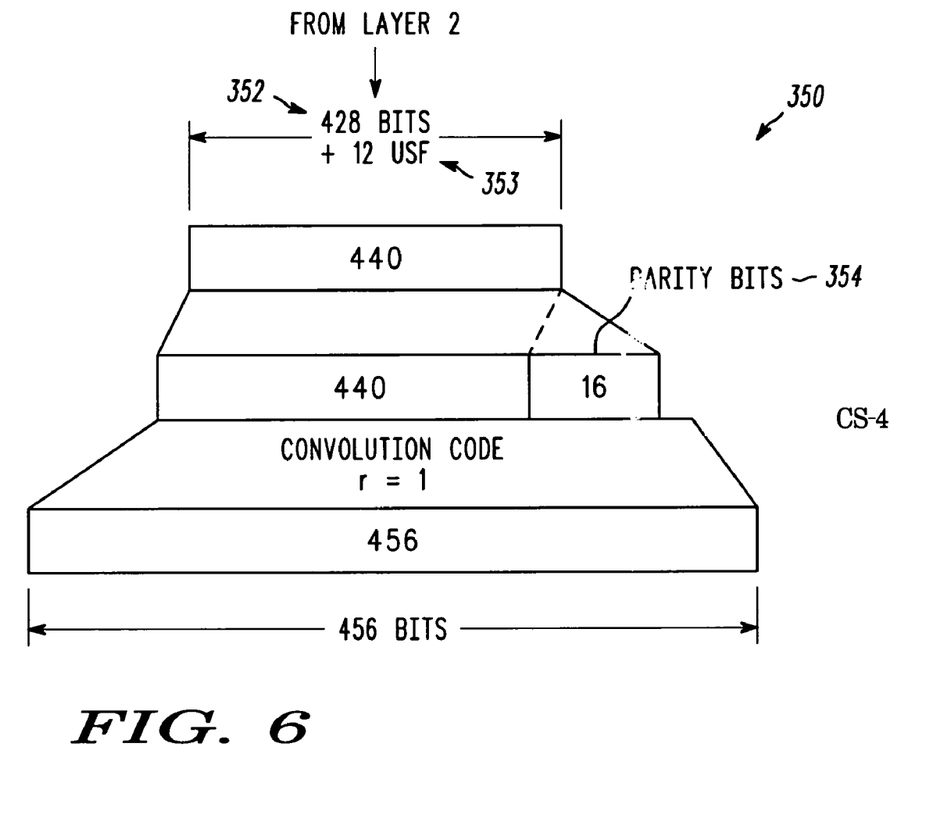

FIG. 6 is an illustration of a coding scheme 4 (CS-4) 350 where no copied bits are generated and no bits are punctured. Referring to FIG. 6, for CS-4, 428 Layer 2 bits 352 are transmitted from the PCU 254 to the BTS 260. Unlike coding schemes CS-1, CS-2, and CS-3, only USF bits 353 and parity bits 354 are added to the Layer 2 bits. The addition of 12 USF bits 353 and 16 parity bits 354 to the 428 Layer 2 bits 352 results in exactly 456 bits. Thus, only the original 428 Layer 2 bits 352 are transmitted from the BTS 260 to the MS 270.

When the MS 270 transmits a data burst to the BTS 260 in an uplink data message using one of the coding schemes CS-1, CS-2, CS-3, or CS-4, the data message bits and error control bits are arranged similarly to those in downlink data message bursts. However, the control bits that are included in an uplink burst have meanings different from those of the USF bits in a downlink burst and may be different in number than the USF bits of a downlink burst.

The CS-4 350 provides the most efficient utilization of bandwidth resources and is therefore the coding scheme of choice when channel conditions of the communication channel 124 permits (i.e., optimum channel conditions) and the equipment (BTS 260 and MS 270) is capable of such encoding scheme. Conversely, the CS-1 300 provides the most reliable scheme to ensure data integrity of the GPRS radio blocks received or transmitted by the MS-1 and is therefore the coding scheme of choice when the communication channel 124 is adversely affected or when transmission of a control information message is required. The CS-2 330 and the CS-3 340 provide intermediate coding schemes.

As will be appreciated by those of ordinary skill in the art, coding schemes for GPRS PDTCH can be achieved using a number of coding schemes, for example modulation and coding schemes, MCS-1 to MCS-9 suitable for use with enhanced GPRS.

GSM specifications include requirements that mobile stations 270 that are designed for use in GPRS systems be capable of receiving and transmitting the four defined coding schemes CS-1, CS-2, CS-3, and CS-4. However, there are mobile stations 270 that have been distributed that do not conform to these requirements, and which support, for example, only CS-1 and CS-2, and make no response to a command to transmit using, for example, the CS-3 coding scheme. The present invention provides methods of selecting a coding scheme for use in transmitting uplink and downlink messages in an optimized manner in a system that includes such mobile stations, as well mobile stations that support all four GPRS coding schemes. It will be appreciated that the inventive methods described herein also apply to packet data communication systems that have other sets of coding schemes, of which the EDGE system is one example, and for which at least some mobile stations do not respond to a command to switch to particular coding schemes.

Figure 7:
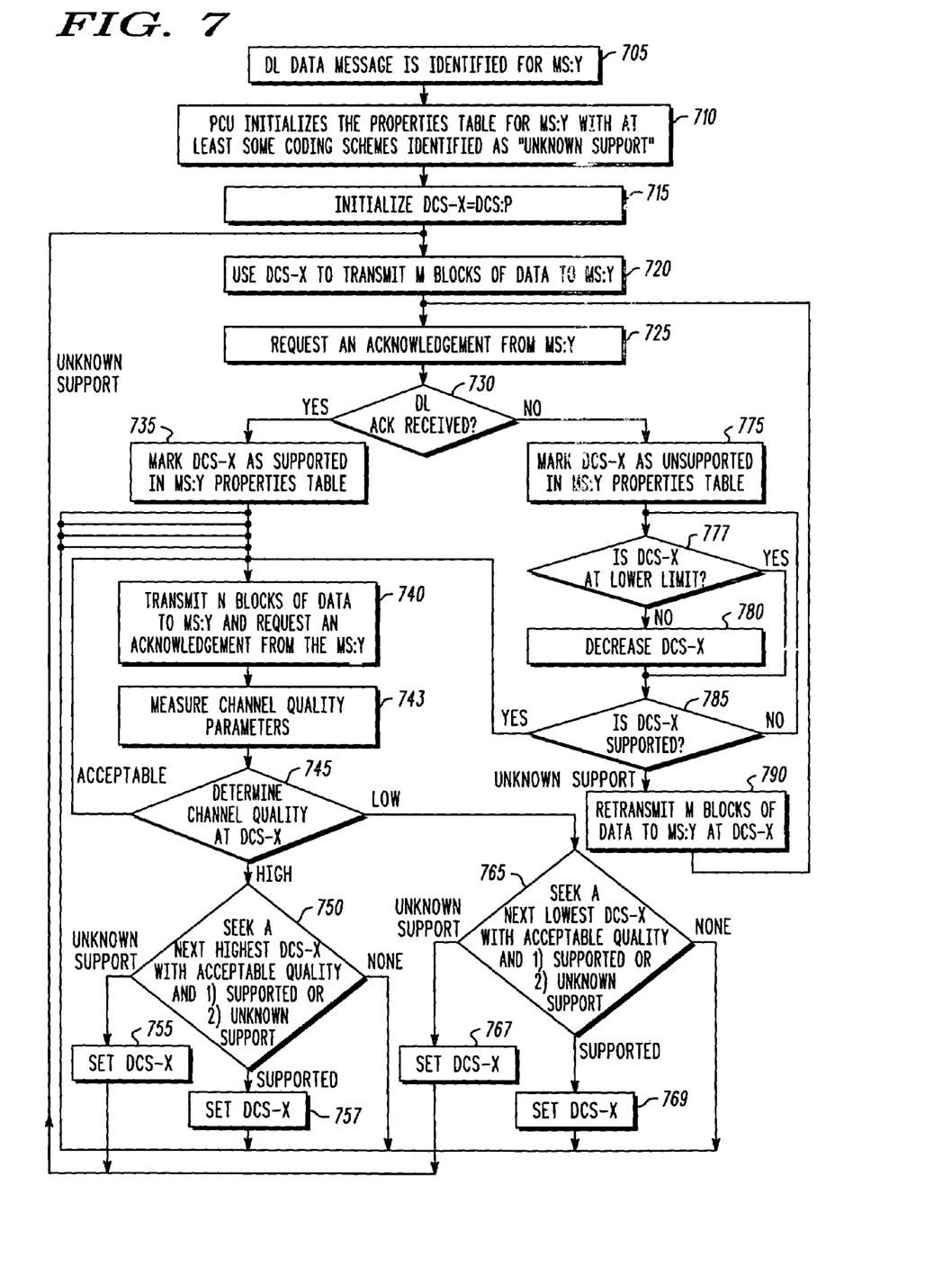
FIG. 7 is a flowchart illustrating a method for selecting a coding scheme for use on an uplink channel of a wireless packet data communication system, in accordance with the present invention.

Referring to FIG. 7, a flow chart is shown that illustrates a method of selecting a coding scheme used to transmit downlink data blocks on a downlink channel, in accordance with the preferred embodiment and alternative embodiments of the present invention. At step 705, an identification is made within the communication system 200 of a new downlink data message intended for a specific mobile station, identified as MS:Y in FIG. 7, and a specific base transceiver site (BTS) 260 is identified for transmitting the message. The PCU 254 creates a Properties Table for MS:Y when the Properties Table does not already exist, which can be the case when MS:Y has not been active in the communication system 200 for a predetermined time (for example, 30 minutes). The Properties Table for MS:Y includes such parameters associated with MS:Y as the mobile radio frequency band capabilities, call processing feature capabilities, and power control capabilities, which are conventional. The Properties Table for MS:Y also includes a unique set of downlink state of support indicators (or "downlink states of support" or "downlink indicators") for the set of coding schemes that might be used for downlink communication between the BTS 260 and MS:Y. The set of coding schemes preferably comprises the coding schemes expected to be used for downlink data packet communications in the communication system 200 for all mobile stations. In accordance with the preferred embodiment of the present invention, the downlink state of support for a mobile station corresponding to each coding scheme can have one of three values: Supported, Unsupported, and Unknown Support. These values indicate a determination by the PCU 254 of the availability of downlink communication between the BTS 260 and MS:Y. When a new Properties Table for MS:Y is created, the PCU 254 initializes the parameters, including the set of downlink states of support, and sets some downlink states of support for MS:Y to a state of Unknown Support. In the example being described herein, there are four downlink coding schemes (CS-1, CS-2, CS-3, CS-4), so the set of states of support has four members. In a first variation, all four coding schemes are set to the state of Unknown Support when a new Properties Table is created for any mobile station, including MS:Y. In a second variation, when a new Properties Table is created, two coding schemes, CS-3 and CS-4, are set to the state of Unknown Support, and two coding schemes, CS-1 and CS-2, are set to the state of Supported for any mobile station. In yet another variation, a function determines (for instance, by using a mobile identifier and another table) a class of mobile stations to which a mobile station belongs and from the class determines which coding schemes are set to a state of Supported, Unsupported, or Unknown Support.

When a new Properties Table for MS:Y is initialized at step 710, a coding scheme parameter associated with MS:Y for transmitting a downlink message, described herein as DCS-X, is set at step 715 to an initial coding scheme, identified in FIG. 7 as DCS-P. DCS-X is a parameter that identifies the coding scheme that is planned to be used for the next data transmission to MS:Y. When DCS-X is changed, a new downlink coding scheme is thereby selected. For example, in the first variation described above, DCS-P is preferably CS-2 and DCS-X is therefore set to CS-2. This coding scheme is selected in this example as the one for initial use because it provides reasonably good throughput but also provides a good probability of data blocks being received adequately error free on the first try. The PCU 254 then directs the BTS 260 to use DCS-X to transmit a predetermined number, M, of next unacknowledged blocks of the data message to MS:Y at step 720, and requests an acknowledgement (ACK) back from MS:Y at step 725. The PCU 254 determines at step 730 whether an ACK for the downlink data blocks (DL ACK) has been received from MS:Y. In accordance with the preferred embodiment of the present invention, a determination that the DL ACK is not received is made only when no blocks of DL ACKS are received sufficiently error free in response to one transmission and two re-transmissions of the next M unacknowledged blocks of data message within a standard time after having been transmitted or re-transmitted. This process provides confidence that MS:Y actually does not provide support for the coding scheme being used (DCS-X), rather than there simply existing a poor signaling environment. It will be appreciated that other numbers of missed acknowledgements could be used (e.g., 1 to 5), with an attendant tradeoff of certainty of the result versus the time needed to obtain it.

When the DL ACK has not been received at step 730, the PCU 254 sets the downlink state of DCS-X (which is this example would be CS-2) in the Properties Table for MS:Y to Unsupported at step 775 (This is also described as marking DCS-X as Unsupported in the MS:Y Properties Table), and determines at step 777 whether DCS-X is at a lower limit, which is DCS-1 in accordance with the preferred embodiment of the present invention. When DCS-X is not at the lower limit, the PCU 254 decreases DCS-X to the next lower coding scheme at step 780, which for the current example would change DCS-X to CS-1. When DCS-X is determined to be at the lower limit at step 777, or when the PCU 254 decreases the DCS-X to the next lower coding scheme at step 780, the PCU 254 then determines the state of support of DCS-X from the Properties Table for MS:Y, at step 785.

When the downlink state of support is determined to be Unknown Support at step 785, the PCU 254 directs the BTS 260 at step 790 to retransmit to MS:Y the M unacknowledged blocks previously transmitted at step 720 using DCS-X, and requests an acknowledgement (ACK) back from MS:Y at step 725 and proceeds from step 725 as described above. When the downlink state of support is determined to be Unsupported at step 785, the PCU 754 again determines whether DCS-X is at the lower limit at step 777 and proceeds from there as described above.

When the DL ACK has been received at step 730, the PCU 254 sets the downlink state of support for DCS-X (which is this example would be CS-2) in the Properties Table for MS:Y to Supported at step 735. (This is also described as marking DCS-X as Supported in the MS:Y Properties Table). The DL ACK being "received" is the inverse of the DL ACK being "not received" as described above, i.e., it is when any block of the DL ACK is received sufficiently error free in response to the transmission or two re-transmissions of the next M unacknowledged blocks of the data message within the standard time after transmission or re-transmission. The PCU 254 then directs the BTS 260 at step 740 to transmit a second predetermined number, N, of next unacknowledged blocks of the data message to MS:Y and to request an acknowledgment from MS:Y at step 740. The PCU also directs the BTS 260 at step 740 to transmit a second predetermined number, N, of next unacknowledged blocks of the data message to MS:Y and to request an acknowledgment from MS:Y when the downlink state of support is determined to be Supported at step 785. Channel parameters are measured by the BTS 260 during the receipt of an acknowledgment (if any) from the MS:Y at step 743 and sent to the PCU 254. The channel quality parameters are conventional channel quality parameters, such as bit and block error rates absolute received signal strength (RSS) and RSS variation, or combinations thereof. At step 745, the parameters are used to determine the channel quality relative to the coding scheme, DCS-X, used to transmit the N blocks of data. Levels used by the PCU 254 for the determination of channel quality made in step 745 are established at the time of equipment fabrication or system set-up for each coding scheme in a manner that optimizes the selection of the coding schemes used during the downlink data message.

When the channel quality is determined to be between a first level and a second level for coding scheme DCS-X at step 745, the quality is acceptable and as a result, the PCU 254 directs the BTS 260 at step 740 to transmit the next N unacknowledged blocks of the data message to MS:Y and to request an acknowledgment from MS:Y, and proceeds from step 740 as described above. When the channel quality is above the second level for coding scheme DCS-X at step 745, the quality is high and as a result the PCU 254 at step 750 seeks a next highest coding scheme at which the channel quality is at least acceptable and the coding scheme state is set to Supported or Unknown Support. The determination of the channel quality at each coding scheme is made using the same parameter measurements made in step 743, but with levels associated with each coding scheme. For example, if DCS-X was at CS-2 at step 740, the PCU 254 would determine the channel quality for CS-3 and if it was at least acceptable, the PCU 254 would determine whether the downlink state of support is Supported or Unknown Support for DCS-3. If the channel quality was at least acceptable for CS-3, but the downlink state was Unsupported for DCS-3, the PCU 254 would then determine if the channel quality for CS-4 was at least acceptable and whether the downlink state was Supported or Unknown Support for DCS-4. When the PCU 254 determines a coding scheme at which the channel quality is at least acceptable and the downlink state of support is Unknown Support at step 750, the PCU 254 sets DCS-X to the determined coding scheme at step 755 and directs the BTS 260 at step 720 to use DCS-X to transmit the next unacknowledged M blocks of the data message to MS:Y, and proceeds from step 720 as described above. When the PCU 254 determines a coding scheme at which the channel quality is at least acceptable and the downlink state of support is Supported at step 750, the PCU 254 sets DCS-X to the determined coding scheme at step 757 and directs the BTS 260 at step 740 to transmit the next unacknowledged N blocks of the data message to MS:Y and to request an acknowledgment from MS:Y, and proceeds from step 740 as described above. When the PCU 254 finds no coding scheme that is higher than the coding scheme most recently used at step 740 to transmit N blocks, and at which the channel quality is at least acceptable and the downlink state of support is set to Supported or Unknown Support at step 750, the PCU 254 does not change the coding scheme most recently used to transmit N blocks, and directs the BTS 260 at step 740 to transmit the next unacknowledged N blocks of the data message to MS:Y and to request an acknowledgment from MS:Y, and proceeds from step 740 as described above.

When the channel quality is determined to be below the first level for coding scheme DCS-X at step 745, the quality is low and as a result the PCU 254 at step 765 seeks a next lowest coding scheme at which the channel quality is at least acceptable and the coding scheme state is set to Supported or Unknown Support. The determination of the channel quality at each coding scheme is made using the same parameter measurements made in step 743, but with different levels associated with each coding scheme. For example, if DCS-X was at CS-3 at step 740, the PCU 254 would determine the channel quality for CS-2 and if it was at least acceptable, the PCU 254 would determine whether the downlink state of support is Supported or Unknown Support for DCS-2. If the channel quality was at least acceptable for CS-2, but the downlink state was Unsupported for DCS-2, the PCU 254 would then determine if the channel quality for CS-1 was at least acceptable and whether the downlink state was Supported or Unknown Support for DCS-1. When the PCU 254 determines a coding scheme at which the channel quality is at least acceptable and the downlink state of support is Unknown Support at step 765, the PCU 254 sets DCS-X to the determined coding scheme at step 767 and directs the BTS 260 at step 720 to use DCS-X to transmit the next unacknowledged M blocks of the data message to MS:Y, and proceeds from step 720 as described above. When the PCU 254 determines a coding scheme at which the channel quality is at least acceptable and the downlink state of support is Supported at step 765, the PCU 254 sets DCS-X to the determined coding scheme at step 769 and directs the BTS 260 at step 740 to transmit the next unacknowledged N blocks of the data message to MS:Y and to request an acknowledgment from MS:Y, and proceeds from step 740 as described above. When the PCU 254 finds no coding scheme that is lower than the coding scheme most recently used at step 740 to transmit N blocks, and at which the channel quality is at least acceptable and the downlink state of support is set to Supported or Unknown Support, the PCU 254 does not change the coding scheme most recently used at step 740 to transmit N blocks, and directs the BTS 260 at step 740 to transmit the next unacknowledged N blocks of the data message to MS:Y and to request an acknowledgment from MS:Y, and proceeds from step 740 as described above.

Using the procedures described with reference to FIG. 7, a best coding scheme for transmitting blocks of data messages downlink from the BTS 260 to MS:Y is rapidly determined, whether the signaling environmental conditions are stable or not and regardless of whether MS:Y is a mobile station that is enabled to transmit on all coding schemes defined for the communication system or MS:Y is a mobile station that does not respond to certain coding schemes. When the signaling conditions are stable, it will be appreciated that the procedure can loop between the functions described above with reference to steps 740, 743 and 745 for a large portion of a moderate length data message.

Figure 8:
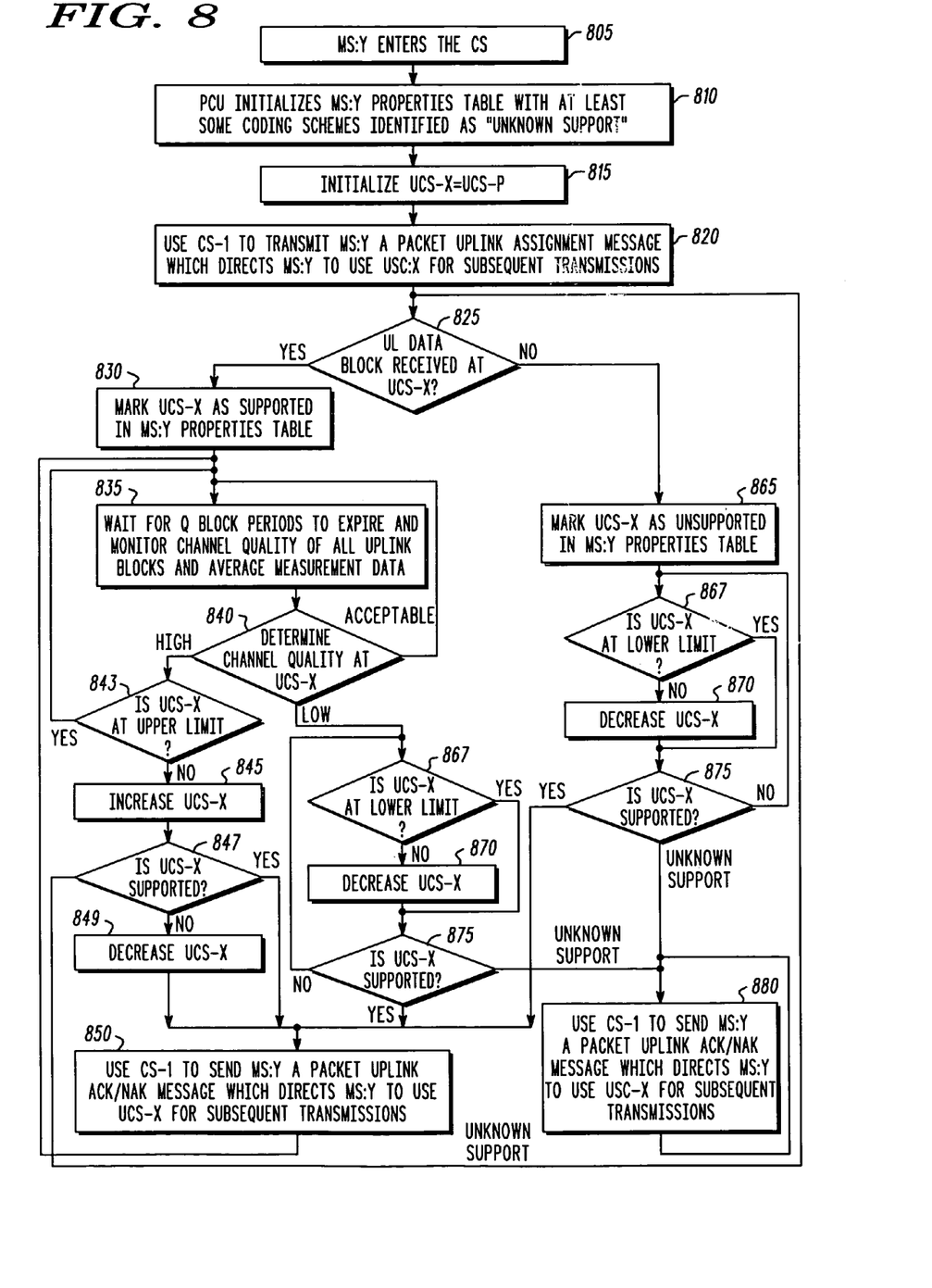
FIG. 8 is a flowchart illustrating a method for selecting a coding scheme for use on an uplink channel of a wireless packet data communication system, in accordance with the present invention.

Referring to FIG. 8, a flow chart illustrates a method of selecting a coding scheme used to transmit uplink data blocks on an uplink channel, in accordance with the preferred and alternative embodiments of the present invention. At step 805, a mobile station 270, identified for this description as MS:Y, enters the communication system 200. MS:Y is defined to enter the communication system 200 when MS:Y sends a request for uplink resources for transmitting an Uplink data message and no Properties Table for MS:Y exists for MS:Y in the BSS 250. Other conditions may exist for which MS:Y is defined to have entered the system—for example, when a Properties Table exists for MS:Y but the Properties Table has a different BTS 260 identified than the one that has received the indicator of the Uplink data message. When MS:Y enters the communication system 200, a new Properties Table is created at step 810 that includes the parameters described above with reference to FIG. 7, as well as a unique set of uplink state of support indicators (or "upnlink states of support" or "uplink indicators") for the set of coding schemes that might be used for downlink communication between the BTS 260 and MS:Y. The set of coding schemes preferably comprises the coding schemes expected to be used for downlink data packet communications in the communication system 200 for all mobile stations. In accordance with the preferred embodiment of the present invention, the uplink state of support of a mobile station corresponding to each coding scheme can have one of three values: Supported, Unsupported, and Unknown Support. These values indicate a determination by the PCU 254 of the availability of uplink communication between the BTS 260 and MS:Y. When a new Properties Table for MS:Y is created, the PCU 254 initializes the parameters, including the set of uplink states of support, and sets some uplink states of support of MS:Y to a state of Unknown Support. In the example being described herein, there are four uplink coding schemes (CS-1, CS-2, CS-3, CS-4) that are the same as the four downlink coding schemes, so the set has four members. As with the downlink method described above, a variety of combinations exist for initializing the uplink states of support. In the preferred embodiment of the present invention, all uplink states of support are set to "Unknown Support".

When a new Properties Table for MS:Y is initialized at step 810, a coding scheme parameter associated with MS:Y for transmitting an uplink message, described herein as UCS-X, is set at step 815 to an initial coding scheme, identified in FIG. 8 as UCS-P. UCS-X is a parameter that identifies the coding scheme that is planned to be used for the next data transmission from MS:Y. When UCS-X is changed, a new uplink coding scheme is thereby selected. For example, in the first variation described above, UCS-P is preferably CS-2 and DCS-X is therefore set to CS-2. This coding scheme is selected in this example as the one for initial use because it provides reasonably good throughput but also provides a good probability of data blocks being received adequately error free on the first try. At step 820, the PCU 254 directs the BTS 260 to use CS-1 to transmit MS:Y a Packet Uplink Assignment message which directs MS:Y to use UCS-X (in this example, CS-2) to transmit subsequent blocks of the uplink data message, which are preferably some initial blocks of the data message that have not yet been transmitted.

When an uplink data block is received sufficiently error free at BTS 260 from MS:Y at step 825 that has been encoded using the UCS-X assigned at step 820, the PCU 254 sets the state of support of MS:Y for UCS-X to Supported at step 830 (which is also described as marking UCS-X as Supported in the MS:Y Properties Table), and continues receiving data blocks of the uplink data message. When a selected quantity, Q, of block periods have expired after the beginning of the uplink data message (or after the end of a previous set of Q block periods within the same message) at step 835, channel parameters measured by the BTS 260 during the receipt of the Q blocks of data are averaged by the BTS 260 and the averaged measurements are sent to the PCU 254 (in an alternative embodiment, the parameters are sent to the PCU 254 and averaged therein). The channel quality parameters are conventional channel quality parameters, such as bit and block error rates absolute received signal strength (RSS) and RSS variation, or combinations thereof. At step 840, the parameters are used to determine the channel quality relative to the coding scheme, UCS-X, used to transmit the N blocks of data. Levels used by the PCU 254 for the determination of channel quality made in step 835 are established at the time of equipment fabrication or system set-up for each coding scheme in a manner that optimizes the selection of the coding schemes used during the uplink data message, and are not necessarily the same as for the downlink coding schemes, particularly if they are different coding schemes.

When the channel quality is determined to be acceptable at step 840, the PCU 254 again waits at step 835 for Q more block periods to have expired after the end of the previous set of Q block periods within the same message and averages the channel quality parameter measurements, and then proceeds from step 835 as described above.

When the channel quality is determined to be low at step 840, the PCU 254 determines whether UCS-X is at a lower limit (e.g., CS-1) at step 853. When it is not at the lower limit at step 853, the PCU 254 decreases UCS-X to the next lower channel coding at step 855 and determines the state of uplink support of the lowered UCS-X at step 860. When the PCU 254 determines UCS-X is at a lower limit (e.g., CS-1) at step 853, the PCU 254 determines the state of uplink support of the lowered UCS-X at step 860. When the uplink state of support is Unsupported at step 860, the PCU 254 again determines whether UCS-X is at a lower limit at step 853 and proceeds from step 853 as described above. When the uplink state of support is Unknown Support at step 860, the PCU 254 directs the BTS 260 at step 880 to use CS-1 to transmit MS:Y a Packet Uplink Acknowledgement/Negative Acknowledgement message (in FIG. 8, "Packet Uplink ACK/NAK") which directs MS:Y to use UCS-X to transmit subsequent blocks of the uplink data message, and waits a preset time at step 825 to determine whether an uplink data block is received at UCS-X. The method continues based on the determination made at step 825 as described elsewhere herein. In present day GSM systems, the subsequent blocks are blocks that have not yet been transmitted, but in other systems or future GSM systems they may include blocks for retransmission that were unacknowledged when transmitted using the previous coding scheme. When the uplink state of support is Supported at step 860 the PCU 254 directs the BTS 260 at step 850 to use CS-1 to transmit MS:Y a Packet Uplink Acknowledgement/Negative Acknowledgement message which directs MS:Y to use the decreased UCS-X for subsequent transmissions of blocks of uplink data, and waits at step 835 for Q more block periods to have expired after the end of the previous set of Q block periods within the same message and averages the channel quality parameter measurements, and then proceeds from step 835 as described above.

When the channel quality is determined to be high at step 840, the PCU 254 determines whether UCS-X is at an upper limit (e.g., CS-4) at step 843 and when it is, the PCU 254 again waits at step 835 for Q more block periods to have expired after the end of the previous set of Q block periods within the same message, and proceeds from step 835 as described above. When UCS-X is not at the upper limit at step 843, the PCU 254 increases UCS-X to the next higher channel coding at step 845 and determines the state of uplink support of the raised UCS-X at step 847. When the uplink state of support is Unsupported at step 847, the PCU 254 decreases the coding scheme at step 849 back to that used to determine the channel quality at step 840 and directs the BTS 260 at step 850 to use CS-1 to transmit MS:Y a Packet Uplink Acknowledgement/Negative Acknowledgement message which directs MS:Y to use UCS-X for subsequent transmissions of blocks of uplink data, and waits at step 835 for Q more block periods to have expired after the end of the previous set of Q block periods within the same message and averages the channel quality parameter measurements, and then proceeds from step 835 as described above. When the uplink state of support is Unknown Support at step 847, the PCU 254 directs the BTS 260 at step 880 to use CS-1 to transmit MS:Y a Uplink Acknowledgement/Negative Acknowledgement message which directs MS:Y to use UCS-X to transmit subsequent blocks of the uplink data message, and waits a preset time at step 825 to determine whether an uplink data block is received at UCS-X. The method continues based on the determination made at step 825 as described elsewhere herein. When the uplink state of support is Supported at step 847 the PCU 254 directs the BTS 260 at step 850 to use CS-1 to transmit MS:Y a Packet Uplink Acknowledgement/Negative Acknowledgement message which directs MS:Y to use the increased UCS-X for subsequent transmissions of blocks of uplink data, and waits at step 835 for Q more block periods to have expired after the end of the previous set of Q block periods within the same message and averages the channel quality parameter measurements, and then proceeds from step 835 as described above.

When an uplink data block is not received at BTS 260 from MS:Y at step 825, the PCU 254 sets the uplink support state for the coding scheme, UCS-X, that MS:Y was directed to use at step 820 to Unsupported at step 865 (also described as marking UCS-X as unsupported in the MS:Y Properties Table). "Not received" in this context means that no recoverable signal was received within an expected maximum time, or that a signal was received within the maximum expected time but it was encoded using a coding scheme other than UCS-X, or that it was received within the maximum expected time, but was not sufficiently error free. At step 867 the PCU 254 then checks whether UCS-X is at the lower limit (e.g., CS-1). When UCS-X is not at the lower limit at step 867, the PCU 254 decreases UCS-X at step 870 and then determines whether the uplink state of UCS-X is Supported at step 875. When UCS-X is at the lower limit at step 867, the PCU 254 then determines whether the uplink state of UCS-X is Supported at step 875. When the uplink state of UCS-X is Supported at step 875, the PCU 254 directs the BTS 260 at step 850 to use CS-1 to transmit MS:Y a Packet Uplink Acknowledgement/Negative Acknowledgement message which directs MS:Y to use the increased UCS-X for subsequent transmissions of blocks of uplink data, and waits at step 835 for Q more block periods to have expired after the end of the previous set of Q block periods within the same message and averages the channel quality parameter measurements, and then proceeds from step 835 as described above. When the uplink state of UCS-X is Unsupported at step 875, the PCU 254 determines whether UCS-X is at the lower limit at step 867 and proceeds from there as described above. When the state of UCS-X is determined to be Unknown Support at step 875, the PCU 254 directs the BTS 260 at step 880 to use CS-1 to transmit MS:Y a Packet Uplink Acknowledgement/Negative Acknowledgement message which directs MS:Y to use UCS-X to transmit subsequent blocks of the uplink data message, and waits a preset time at step 825 to determine whether an uplink data block is received at UCS-X. Conventional mobile stations designed for GSM systems re-transmit the unacknowledged data blocks using the same coding scheme originally used for their initial transmission. The method continues based on the determination made at step 825 as described herein above. Using the procedures described with reference to FIG. 8, a best coding scheme for transmitting blocks of data messages uplink to the BTS 260 from MS:Y is rapidly determined, whether the signaling environmental conditions are stable or not and regardless of whether MS:Y is a mobile station that is enabled to transmit on all coding schemes defined for the communication system or MS:Y is a mobile station that does not respond to certain coding schemes. When the signaling conditions are stable, it will be appreciated that the procedure can loop between the functions described above with reference to steps 835 and 840 for a large portion of a moderate length data message.

In accordance with the preferred embodiment of the present invention, the same set of coding schemes are used in the uplink and downlink directions. Thus, any particular UCS_X equals the same particular DCS-X (both are CS-X). One Properties Table is maintained for any mobile station that is active in the communication system. The Properties Table includes a set of uplink states of support and a set of downlink states of support. Decisions for selecting an uplink coding schemes are based on both the uplink and downlink set of states of support. In particular, a coding scheme that has an uplink state of support of the mobile station for the coding scheme set to unknown support can only be selected for use on the uplink channel when the downlink state of support of the mobile station for the first coding scheme is set to supported. One method that the PCU 254 can use to accomplish is to check, after a determination is made at step 847, 860, or 875 that the uplink state of support for the mobile station for UCS-X is set to unknown support, whether the downlink state of support for the mobile station for DCS-X is Supported, and if so, the PCU 254 uses UCS-X for the uplink data transfer. This improves the probability of selecting a good uplink coding scheme.

Figure 9:
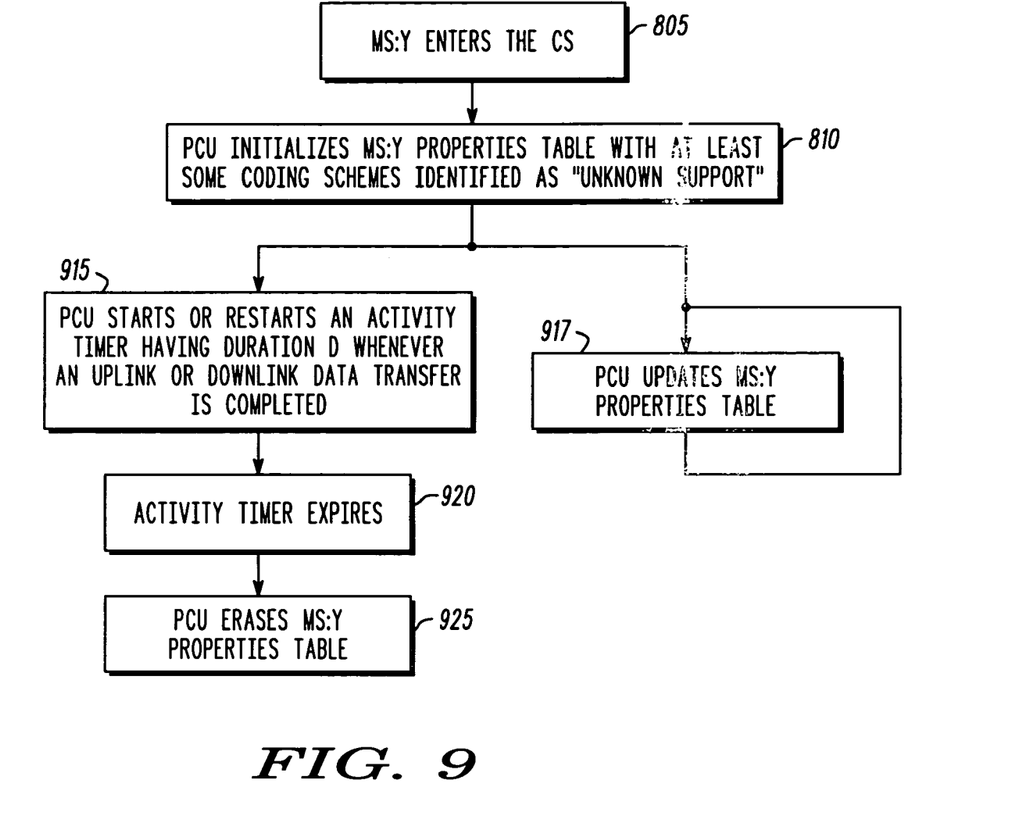
FIG. 9 is a flowchart illustrating a method for managing storage space in a wireless packet data communication system that has a set of coding schemes that are useable on the uplink and downlink channels.

Referring to FIG. 9, a flow chart shows a method used in accordance with the preferred embodiment of the present invention. The steps 805 and 810 are as described above with reference to FIG. 7. Before step 915, MS:Y has entered the communication system and is active in the system. At step 915, the PCU 254 starts or restarts an activity timer at step 915 having a predetermined duration, D, whenever an uplink or downlink data transfer is completed. In this context, completed means the data transfer has been successfully made or the PCU 254 has abandoned the attempt to make the data transfer for any reason. Other restarting events could be used—for example the beginning of an uplink or downlink data transfer. One example of a duration for the activity timer is 5 minutes. When the duration expires at step 920, the PCU 254 erases the Properties Table (or Tables, if there are separate uplink and downlink Properties Tables) at step 925. After the MS:Y Properties Table is set up at step 810, it is updated at step 917 whenever events such as those described with reference to steps 735 and 775 in FIG. 7 and steps 830 and 865 in FIG. 8 occur, until the MS:Y Properties Table is erased at step 925. This method, which advantageously minimizes storage space in the PCU 254, can also be described as including a function of erasing the Properties Table after a predetermined duration during which no uplink data transfer and no downlink data transfer is communicated with the mobile station.

In accordance with alternative embodiments of the present invention, an operator of the communication system 200 can set up a group of coding schemes or a plurality of groups of mutually exclusive groups of coding schemes, each of which comprises two or more of the coding schemes in the set or sets of coding schemes used in the communication system 200. In one of the alternative embodiments, which is a modification of the preferred embodiment, there is one set of coding schemes used for both uplink and downlink data transfers. In another alternative embodiment, there is an uplink set of coding schemes and a downlink set of coding schemes. When the state of support of one of the coding schemes in a group is set to unsupported, the states of support of all other of the coding schemes in the group are set to unsupported. This method is useful when, for example, it is known by the operator that some mobile stations 270 that are expected to use the operator's communication system have coding schemes in a group or groups that are unsupported. For example, when the operator knows that some mobile station 270 do not support CS-3 and CS-4, then CS-3 and CS-4 can be advantageously grouped together. Having set up a group, when the PCU 254 sets the state of support of one of the coding schemes in the group to unsupported, the PCU 254 also sets the states of support of all other of the coding schemes in the group to unsupported. This improves the efficiency of selecting a good coding scheme.

In accordance with the preferred embodiment of the present invention, CS-1 is never set to a support state of Unsupported. This avoids infinite loop situations in the loops 777-780-785, 853-855-860, and 867-870-875. In alternative systems in which CS-1 could be Unsupported, a more complicated function such as the one described with reference to blocks 765, 767, 769 can be used to avoid the infinite loop situation.

It will be appreciated that there are a variety of ways to accomplish some of the same functions described herein. For example, steps 867 and 870 could be equivalently described in one step as "decrease UCS-X when it is not at the lower limit". Or, for example, having step 847 following directly after step 843, inserting step 845 into the "unknown support" and "yes" result branches of step 847 and deleting step 849 from the "No" result Branch of step 847 would be equivalent to the approach described above.

For the methods described above with reference to FIGS. 7 and 8, some steps that may have been described elsewhere herein and some steps that are obvious to one of ordinary skill in the art may not be shown in the flow chart, but would be used in the method. The methods described with reference to FIGS. 7 and 8 are performed in the BSS 250 of the communication system 200, and are designed to require no hardware or programming changes to currently available mobile stations 270. The methods described with reference to FIGS. 7 and 8 are preferably embedded in the PCU 254 in the form of a novel set of program instructions executed by a conventional processor using conventional memory, but the methods could alternatively be embedded in, for example, the BSC 252 or the BTS 260, as would be typical for a communication system 200 not having a PCU 254 as a separate identified piece of equipment In summary, persons of ordinary skill in the art will readily appreciate that methods for selecting a more optimal channel coding scheme in a communication system that can include mobile stations having unsupported coding schemes have been provided. Systems using the example apparatus and methods described herein may benefit from reduced block error rate (resulting from poor coding scheme decisions), fewer retransmissions of user data blocks, and increased battery life of the mobile stations, increased spectral efficiency and higher user data throughput to an end user.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "block" has been described herein primarily with reference to the GPRS data message scheme used in GSM systems, but should be understood to be a basic time duration used in any packet data signaling protocol. "Coding scheme" should be understood to mean any combination of error protection and correction and modulation speed and type, that results in a recovered data throughput rate that can be ranked in an ordinal manner with all other such combination within at least one direction (uplink or downlink) of a signaling protocol.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A method of selecting a coding scheme for use on an uplink channel of a wireless packet data communication system, the coding scheme being one of a set of coding schemes that are useable on the uplink channel, comprising:

setting each of a set of states of support of a mobile station corresponding to each coding scheme of the set of coding schemes to one of a set of values that includes supported, unsupported, and unknown support;

directing the mobile station to transmit a portion of an uplink data transfer using a first coding scheme of the set of coding schemes;

setting the state of support of the mobile station for the first coding scheme to unsupported when the portion of the uplink data transfer is not received having the first coding scheme; and selecting a second coding scheme based upon the set of states of support, wherein the selecting comprises selecting the second coding scheme as a lower coding scheme than the first coding scheme when the state of support of the mobile station for the lower coding scheme is set to one of unknown support and supported.

2. The method according to claim 1, further comprising:
setting at least one initial state of support to unknown support.

3. The method according to claim 1, wherein the method is executed within a fixed network of a wireless packet data communication network.

4. The method according to claim 1, further comprising identifying a group of coding schemes formed from coding schemes of the set of coding schemes, wherein when the state of support corresponding to one of the coding schemes in the group is set to unsupported, the states of support corresponding to all other of the coding schemes in the group are set to unsupported.

5. The method according to claim 1, further comprising:
measuring at least one channel quality parameter during the portion of the uplink data transfer from the mobile station;
setting the state of support of the mobile station corresponding to the first coding scheme to supported when the portion of the uplink data transfer is received having the first coding scheme; and wherein the selecting of the second coding scheme is further based upon the at least one channel quality parameter.

6. The method according to claim 5, further comprising:
setting at least one initial state of support to unknown support.

7. A method of selecting a coding scheme for use on an downlink channel of a wireless packet data communication system, the coding scheme being one of a set of coding schemes that are useable on the downlink channel, comprising:

setting each of a set of states of support of a mobile station corresponding to each coding scheme of the set of coding schemes to one of a set of values including supported, unsupported, and unknown support;

transmitting a portion of a downlink data transfer to the mobile station using a first coding scheme of the set of coding schemes;

setting the state of support of the mobile station for the first coding scheme to unsupported when no acknowledgment to the portion of the downlink data transfer is received; and selecting a second coding scheme based upon the set of states of support, wherein the selecting comprises selecting the second coding scheme as a lower coding scheme than the first coding scheme when the state of support of the mobile station for the lower coding scheme is set to one of the unknown support and supported.

8. The method according to claim 7, further comprising:
setting at least one initial state of support to unknown support.

9. The method according to claim 7, further comprising:
retransmitting a portion of the downlink data transfer to the mobile station using the second coding scheme.

10. The method according to claim 7, further comprising identifying a group of coding schemes formed from coding schemes of the set of coding schemes, wherein when the state of support corresponding to one of the coding schemes in the group is set to unsupported, the states of support corresponding to all other of the coding schemes in the group are set to unsupported.

11. The method according to claim 7, wherein the method operates within a fixed network of a wireless packet data communication network.

12. The method according to claim 7, further comprising initiating one of an uplink and downlink data transfer for determining a state of support of the mobile station for a coding scheme when the state of support of the coding scheme remains set in the state of unknown support for a predetermined duration.

13. The method according to claim 7, comprising:
measuring at least one channel quality parameter during the portion of the downlink data transfer from the mobile station; and
setting the state of support of the mobile station for the first coding scheme to supported when an acknowledgment to the portion of the downlink data transfer is received, and wherein the selecting of the second coding scheme is also based on the at least one channel quality parameter.

14. The method according to claim 13, further comprising:
setting at least one initial state of support to unknown support.

15. The method according to claim 13, wherein the selecting comprises:
selecting the second coding scheme as a higher coding scheme than the first coding scheme when the at least one channel quality parameter indicates a high channel quality and the state of support of the mobile station for the higher coding scheme is one of unknown support and supported;
selecting the second coding scheme to be the same coding scheme as the first coding scheme when the at least one channel quality parameter indicates an acceptable channel quality; and
selecting the second coding scheme as a lower coding scheme than the first coding scheme when the at least one channel quality parameter indicates a low channel quality and the state of support of the mobile station for the lower coding scheme is set to one of unknown support and supported.

16. A method of selecting a coding scheme for use on an uplink channel of a wireless packet data communication system, the coding scheme being one of a set of coding schemes that are useable on the uplink and downlink channels, comprising:

setting each state of an uplink set and a downlink set of states of support of a mobile station corresponding to each of the set of coding schemes to one of a set of values including supported, unsupported, and unknown support; and selecting for use by the mobile station for an uplink data transfer a first coding scheme having the uplink state of support of the mobile station for the first coding scheme set to unknown support only when the downlink state of support of the mobile station for the first coding scheme is set to supported.

17. Base station subsystem apparatus that selects a coding scheme for use on an downlink channel of a wireless packet data communication system, the coding scheme being one of a set of coding schemes that are useable on the downlink channel, comprising:

at least one processing unit controlled by a corresponding at least one set of program instructions that sets each of a set of states of support of a mobile station corresponding to each coding scheme of the set of coding schemes to one of a set of values including supported, unsupported, and unknown support; and at least one transmitter that transmits a portion of a downlink data transfer to the mobile station using a first coding scheme of the set of coding schemes, wherein the at least one processing unit sets the state of support of the mobile station for the first coding scheme to unsupported when no acknowledgment to the portion of the downlink data transfer is received; and selects a second coding scheme based upon the set of states of support, wherein the selecting comprises selecting the second coding scheme as a lower coding scheme than the first coding scheme when the state of support of the mobile station for the lower coding scheme is set to one of unknown support and supported.

\* \* \* \* \*